(12) United States Patent
Labranche et al.

(10) Patent No.: US 10,154,146 B2
(45) Date of Patent: Dec. 11, 2018

(54) METHOD OF MANAGING A COMMUNICATION TO A USER, AND AN APPLICATION SERVER

(71) Applicant: ORANGE, Paris (FR)

(72) Inventors: Miguel Labranche, Bonneuil sur Marne (FR); Bruno Tossou, Montgeron (FR); Mbemba Kanoute, Saint Cloud (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/354,038

(22) PCT Filed: Oct. 18, 2012

(86) PCT No.: PCT/FR2012/052370
§ 371 (c)(1),
(2) Date: Apr. 24, 2014

(87) PCT Pub. No.: WO2013/060967
PCT Pub. Date: May 2, 2013

(65) Prior Publication Data
US 2014/0301334 A1    Oct. 9, 2014

(30) Foreign Application Priority Data
Oct. 28, 2011    (FR) ..................... 11 59841

(51) Int. Cl.
*H04M 7/00*    (2006.01)
*H04L 29/06*    (2006.01)

(52) U.S. Cl.
CPC ...... *H04M 7/0075* (2013.01); *H04L 65/1016* (2013.01); *H04L 65/1059* (2013.01); *H04L 65/1063* (2013.01); *H04L 65/80* (2013.01)

(58) Field of Classification Search
CPC . H04L 65/1016; H04L 65/1063; H04L 65/80; H04M 7/0075
See application file for complete search history.

(56) References Cited

U.S. PATENT DOCUMENTS

| | | | |
|---|---|---|---|
| 2008/0075064 A1* | 3/2008 | Krantz | H04L 63/08 370/352 |
| 2010/0158229 A1* | 6/2010 | Ku | H04L 29/1216 379/201.01 |
| 2010/0303222 A1 | 12/2010 | Poder | |

FOREIGN PATENT DOCUMENTS

EP    1 193 944 A2    4/2002

OTHER PUBLICATIONS

International Search Report dated Mar. 22, 2013, for International Application No. PCT/FR2012/052370 filed Oct. 18, 2012, 5 pages.
(Continued)

*Primary Examiner* — Yemane Mesfin
*Assistant Examiner* — Henry Baron
(74) *Attorney, Agent, or Firm* — Knobbe, Martens, Olson & Bear, LLP

(57) ABSTRACT

Disclosed is a management method for managing a communication to a user having an identifier allocated thereto on a voice over IP core network, the method being performed by an application server of the voice over IP core network through which the communication transits, and comprises a process, performed on receiving the communication, of consulting a database to select a terminal linked to the identifier of the user for the purpose of routing the communication to the terminal, the database associating at least one terminal registered on the voice over IP core network and linked to the identifier of the user with at least one period of activity of the terminal on the voice over IP core network,
(Continued)

and the terminal that is selected being the terminal associated in the database with the most recent period of activity.

12 Claims, 2 Drawing Sheets

(56) References Cited

OTHER PUBLICATIONS

International Search Report and Written Opinion dated Mar. 22, 2013, for International Application No. PCT/FR2012/052370 filed Oct. 18, 2012, 10 pages.
3rd Generation Partnership Project; Technical Specification Group Services and System Aspects; IP Multimedia Subsystem (IMS) Centralized Services; Stage 2. 3GPP TS 23.292, Release 11, V11.0.0, 111 pages. Jun. 2011.
3rd Generation Partnership Project; Technical Specification Group Services and Systems Aspects; Service requirements for the Internet Protocol (IP) Multimedia core network Subsystem (IMS); Stage 1. 3GPP TS 22.228, Release 11, V11.4.0, 34 pages. Sep. 2011.
3rd Generation Partnership Project; Technical Specification Group Core Network and Terminals; IP Multimedia (IM) Core Network (CN) subsystem Centralized Services (ICS); Stage 3. 3GPP TS 24.292, Release 10, V10.5.0, 175 pages, Sep. 2011.
Rosenberg, et al. SIP: Session Initiation Protocol. IETF Request for Comments: 3261, 269 pages. Jun. 2002.

* cited by examiner

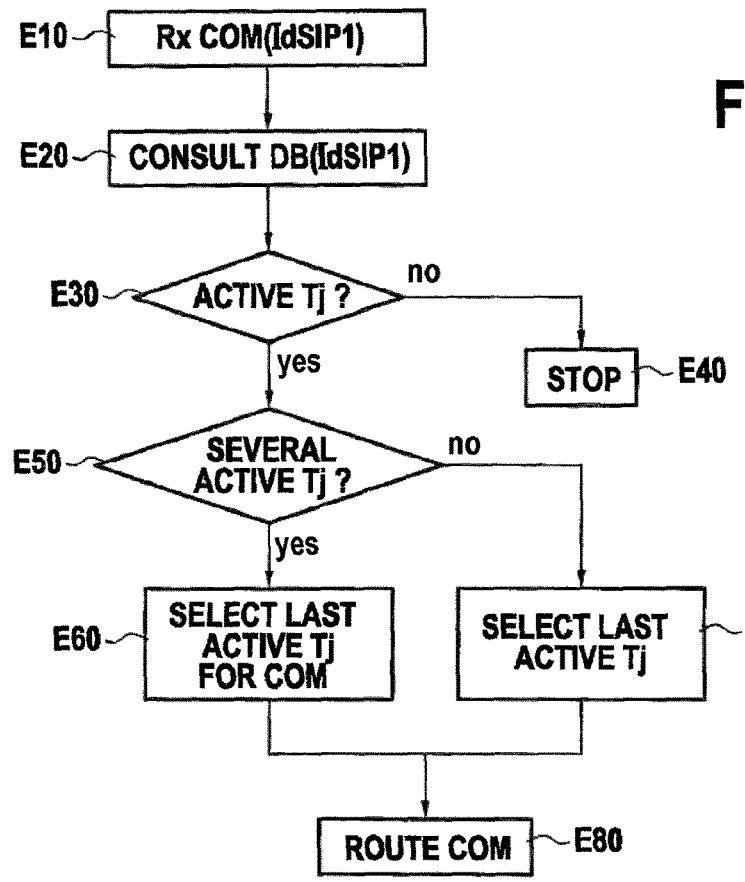

METHOD OF MANAGING A COMMUNICATION TO A USER, AND AN APPLICATION SERVER

RELATED APPLICATIONS

This application is the U.S. National Phase of Application No. PCT/FR2012/052370 entitled "METHOD FOR MANAGING A COMMUNICATION INTENDED FOR A USER, AND APPLICATION SERVER" filed Oct. 18, 2012, which designated the United States, and which claims the benefit of French Application No. 1159841 filed Oct. 28, 2011.

BACKGROUND OF THE INVENTION

The invention relates to the general field of telecommunications.

More particularly it relates to managing and routing a communication to a user by means of an application server of a voice over IP (VoIP) core network, such as for example an IP multimedia subsystem (IMS) core network, and in a context in which a plurality of terminals are linked to the same user identifier on the voice over IP core network.

A preferred but non-limiting application of the invention thus lies in the IMS centralized service (ICS) as developed by the 3GPP standard, and as described in particular in the document 3GPP TS 23.292 entitled "Technical specification group services and system aspects; IP multimedia subsystem centralized services; stage 2", Release 11, v11.0.0, June 2011.

In general, the ICS service seeks to use an IMS core network to offer multimedia services to a mobile user independently of the access network with which the user is connected (i.e. a circuit-switched or a packet-switched access network). Circuit-switched access network users can thus benefit from new IMS services while continuing to benefit from the services conventionally available on circuit-switched access networks, with those services now being managed by the IMS core network.

For this purpose, the ICS service relies in particular on triggering a service centralization and continuity application server (SCC-AS) in charge of ensuring continuity of services for various access networks. The SCC-AS server has in particular the function of managing the terminating of each communication passing therethrough by selecting the domain (packet-switched or circuit-switched) to which the communication is to be routed. The functions of the SCC-AS server are described in greater detail in the document 3GPP TS 24.292 entitled "Technical specification group core network and terminals; IP multimedia core network subsystem; centralized services; stage 3", Release 10, v10.5.0, September 2001.

Furthermore, the 3GPP standard provides the possibility of a user registering a plurality of addresses of contact with the IMS core network, all linked to the same identifier of that user on the core network (e.g. an SIP address). These addresses of contact may be associated with a plurality of different terminals.

Although the 3GPP standard provides for the possibility of the SCC-AS server taking account of multiple terminals linked to the same identifier of the user on the core network, the standard does not describe how this might or must be implemented.

OBJECT AND SUMMARY OF THE INVENTION

The invention satisfies this need in particular by proposing a management method for managing a communication to a user having an identifier allocated thereto on a voice over IP core network, the method being performed by an application server of the voice over IP core network through which the communication transits. In accordance with the invention, the method comprises a step, performed on receiving the communication, of consulting a database to select a terminal linked to the identifier of the user for the purpose of routing the communication to the terminal, the database associating at least one terminal registered on the voice over IP core network and linked to the identifier of the user with at least one period of activity of the terminal on the voice over IP core network, and the terminal that is selected being the terminal associated in the database with the most recent period of activity.

Correspondingly, the invention also provides an application server of a voice over IP core network, suitable for managing a communication transiting therethrough and intended for a user having an identifier allocated thereto on the voice over IP core network. In accordance with the invention, the server includes means that are activated on receiving the communication to consult a database in order to select a terminal linked to the identifier of the user for the purpose of routing the communication to the terminal, the database associating at least one terminal registered on the voice over IP core network and linked to the identifier of the user with at least one period of activity of the terminal on the voice over IP core network, and the terminal that is selected being the terminal associated in the database with the most recent period of activity.

It should be observed that the invention has a preferred but non-limiting application when the voice over IP core network is an IMS core network and the application server is an SCC-AS server of the IMS core network. The invention thus makes it possible to enrich the functions of the SCC-AS server as defined in the 3GPP standard.

In the meaning of the invention, the term "activity" of a terminal is used to cover any protocol activity of that terminal, i.e. any activity associated with exchanging messages over the voice over IP core network (sending or receiving one or more messages), such as for example messages in compliance with the session initiation protocol (SIP). This may comprise in particular a period of activity associated with setting up a call (e.g. associated with sending or receiving an SIP INVITE message), or exchanging information between two terminals (associated with sending or receiving an SIP OPTIONS message), or exchanging information between a terminal and some other piece of equipment of the network, or indeed registering or unregistering the terminal (associated with sending an SIP REGISTER or UNREGISTER message), etc.

When in the presence of a plurality of registered terminals linked to the same identifier of a user on the voice over IP core network, the invention thus proposes routing an incoming communication to the most recently active terminal of the user, i.e. to the terminal that is associated in a database maintained by the application server with the period of activity that is the most recent relative to the incoming communication. The invention thus enhances the reachability of the terminal when performing the selection for the purpose of routing the communication.

In the meaning of the invention, a "communication" intended for a user designates any exchange of data that is to be performed with a terminal of that user, whether in the circuit-switched (CS) domain, or in the packet-switched (PS) domain. The invention makes it possible not only to manage communications of the telephone call type, but also to exchange multimedia data such as, for example: files, photos, multimedia messages, short message service (SMS), etc.

The invention is also particularly advantageous in that it is performed in the voice over IP core network by the application server through which communications transit in the core network, and consequently it does not require any modification to the source or destination terminals of the communication. Terminal selection is also performed in a manner that is automatic, without requiring any intervention by the terminal originating the communication or by the user to whom the communication is being made.

Preferably, the database is updated by the application server, periodically or on the application server detecting a period of activity of a terminal linked to the identifier of the user on the voice over IP core network.

The invention thus makes it possible to have recent and reliable knowledge about the state of activity of a terminal on the voice over IP core network and to adapt communication routing accordingly.

In a particular implementation of the invention, during the selection step, the terminal linked to the identifier of the user and associated with the most recent period of activity is selected while also verifying a predetermined criterion relating to the nature of the activity of the terminal in that period.

Thus, in a first variant, the terminal linked to the identifier of the user and associated with the most recent period of activity is selected with reference to a communication of the same kind as the incoming communication that the application server is seeking to route.

This first variant enables routing to be optimized by taking account of the reachability of the selected terminal relative to the nature of the incoming communication.

In a second variant, during the selection step, the terminal linked to the identifier of the user that is selected is the terminal associated with the most recent period of activity associated with setting up a communication with another terminal.

The selection as performed in this way is particularly pertinent when the communication being managed by the method of the invention is an incoming telephone call. However, when other types of incoming communication are managed by the method of the invention, it also makes it possible to give precedence to the terminal on which the user has had activity in real time.

In other words, in this implementation, a kind of hierarchy is established between the activities of terminals, i.e. certain activities of terminals, such as for example exchanging messages in the context of setting up a call, are considered as having higher priority (or being more pertinent) compared with other activities when selecting a terminal for routing purposes. This makes it possible to optimize routing by taking account of the reachability of the selected terminal given the nature of its past activity, and also relative to the nature of the incoming communication.

In a variant implementation, the predetermined criterion relates to the type message that was sent or received by the terminal during that period.

For example, for an IMS core network and an incoming communication of the telephone call type, when the database has two terminals linked to the same identifier, one of the terminals being associated with a period of activity during which an SIP INVITE message was sent and the other terminal being associated with a period of activity during which an SIP OPTIONS message was sent, terminal selection gives precedence to the terminal for which the period of activity corresponds to sending an SIP INVITE message, since that corresponds to setting up a call.

In a particular implementation of the invention, the management method further comprises a step of routing the communication to the selected terminal.

In a particular implementation, the various steps of the management method are determined by computer program instructions.

Consequently, the invention also provides a computer program on a data medium, the program being suitable for being performed by an application server or more generally by a computer, the program including instructions adapted to performing steps of the management method as defined above.

The program may use any programming language, and may be in the form of source code, object code, or code intermediate between source code and object code, such as in a partially compiled form, or in any other desirable form.

The invention also provides a computer readable data medium, including instructions of a computer program as mentioned above.

The data medium may be an entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium, such as an electrical or optical signal, that may be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In another aspect, the invention also provides a database prepared by an application server of a voice over IP core network and associating at least one terminal registered on the voice over IP core network and linked to an identifier of a user on said voice over IP core network with at least one period of activity of the terminal on the voice over IP core network.

In yet another aspect, the invention provides a voice over IP core network system comprising:
  an application server in accordance with the invention; and
  a database in accordance with the invention prepared by the application server and used to select a terminal to which to route a communication transiting via the application server and intended for a user identified on the voice over IP core network.

In other implementations, it is also possible to envisage that the management method, the application server, the database, and the system of the invention present in combination all or some of the above-specified characteristics.

BRIEF DESCRIPTION OF THE DRAWINGS

Other characteristics and advantages of the present invention appear from the following description made with reference to the accompanying drawings that show an implementation having no limiting character. In the figures:

FIG. 3 shows the main steps performed during the communication management method of the invention, with the method being performed by the FIG. 1 application server; and FIG. 4 shows an example of a database in accordance with the invention.

DETAILED DESCRIPTION OF AN EMBODIMENT

Figure 1:
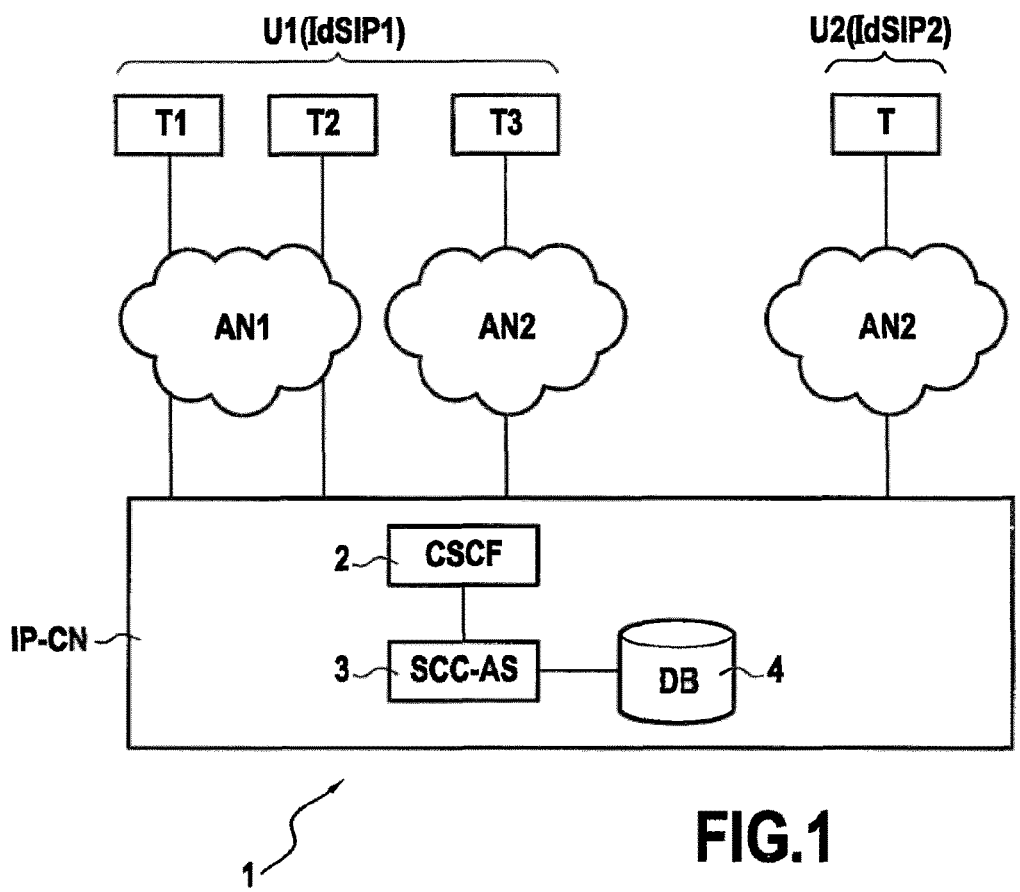
FIG. 1 is a diagrammatic representation of a system, an application server, and a database in accordance with the invention in a particular embodiment.

FIG. 1 shows, in its environment, a system 1 of a voice over IP core network IP-CN in accordance with the invention in a particular embodiment.

In this embodiment, the VoIP core network IP-CN is a core network incorporating IMS architecture and making use of the SIP protocol for the signaling that is exchanged in the core network. The characteristics of IMS architecture and SIP protocol are defined respectively in the 3GPP and IETF standards, and in particular in the documents: 3GPP TS 22.228 "Service requirements for the IP multimedia core network subsystem (stage 1)"; and IETF RFC 3261 "Session initiation protocol". They are therefore not described in detail herein.

This assumption concerning the core network is nevertheless not limiting. Thus, the invention is equally applicable to other core network architectures, such as for example an H323 architecture.

In known manner, the IMS core network IP-CN comprises a plurality of functional entities, including in particular:

- a call session control function (CSCF) entity 2, itself made up of a plurality of servers (not shown in FIG. 1) including in particular a serving call session control function (S-CSCF) server in charge of registering terminals on the core network IP-CN, and one or more proxy call session control functions (P-CSCF) servers, which are points of contact for terminals with the core network IP-CN; and
- one or more application servers hosting and supplying services, for example a telephony application server (TAS) (not shown) and a service centralization and continuity application server (SCC AS) 3, participating in making an IMS centralized service (ICS) available by the core network IP-CN. The architecture and the functions of an SCC AS server and of the ICS service are described in greater detail in the above-mentioned documents: 3GPP TS 23.292 and 3GPP TS 24.292.

In the presently described example, attention is given to managing a communication placed by a user U2 having a terminal T and intended for a user U1 having a plurality of terminals T1, T2, and T3 linked to the same identifier IdSIP1 (e.g. an SIP address) of the user U1 on the core network IP-CN. It is assumed that the user U2 is identified on the IP core network by the identifier IdSIP2.

Each of the terminals T1, T2, and T3 of the user U1 is associated with a respective address of contact AoC1, AoC2, and AoC3 on the core network IP-CN. The addresses of contact AoC1, AoC2, and AoC3 are all linked to the identifier IdSIP1 of the user U1, as is possible in the 3GPP standard.

In the presently described example, the terminals T1 and T2 are suitable for communicating via an access network AN1, e.g. via a packet-switched access network such as the universal mobile telecommunication system (UMTS) network; the terminal T3 is suitable for communicating via an access network AN2, e.g. via a circuit-switched access network such as the global system for mobile communication (GSM) network. In similar manner, it is assumed that the user U2 has a single terminal T suitable for communicating over the circuit-switched network AN2.

Naturally, other access networks (whether circuit-switched or packet-switched) or some other configuration of the access networks of the terminals T1, T2, T3, and T could be envisaged, given the functions of the IMS architecture under consideration. Likewise, the invention applies to other numbers of terminals associated with the user U1.

In order to be able to benefit from the ICS service made available by the core network IP-CN, the terminals T, T1, T2, and T3 need to register with the core network IP-CN in conventional manner as described in particular in the document 3GPP TS 23.292. The intervention of an enhanced mobile switching server (eMSC) forming the transition between the "circuit" core network and the IMS core network may be required for terminals connected to circuit-switched networks.

This registration serves in particular to enable the core network IP-CN to associate, in the home subscriber server (HSS) of the core network, the addresses of contact AoC1, AoC2, and AoC3 with the identifier IdSIP1 of the user U1, the address of contact AoC with the identifier IdSIP2 of the user U2, and where appropriate to trigger initial filter criteria (IFC) to enable the terminals to benefit from the ICS service.

It should be observed that for the terminals T1, T2, and T3, this registration marks the beginning of a potential period of activity in the protocol meaning of the term, i.e. following this registration, the terminals T1, T2, and T3 are in a position to send and/or receive one or more messages in accordance with the SIP protocol, in this example via the core network IP-CN. The sending or reception of a message by a terminal via the core network IP-CN constitutes a period of activity of the terminal in the meaning of the invention.

The SCC AS server 3 in this example is an application server of the system 1 in accordance with the invention. It is suitable for acting in accordance with the invention to manage and route a communication for the user U1 as placed by the user U2 so that the communication goes to that one of the terminals of the user U1 that is associated with the most recent period of activity.

For this purpose, in the presently described implementation, the SCC AS server 3 prepares and keeps up to date a database 4 in accordance with the invention, which database associates each of the terminals of the user U1 that is registered with the core network IP-CN with at least one period of activity of that terminal on the voice over IP core network. This period of activity may in particular be identified in the database 4 by the instant at which the terminal sent or received a message during the period of activity, and possibly by the type of SIP message that was sent or received during that period of activity.

FIG. 4 shows an example of such a database. In the meaning of the invention, a "database" designates any type of architecture suitable for storing data, such as a table as shown in FIG. 4.

In this example, the terminals T1, T2, and T3 having respective addresses of contact AoC1, AoC2, and AoC3 that are linked to the identifier IdSIP1 of the user U1 are registered with the core network IP-CN: this is represented by the value "REGISTERED" for the terminal state as given in the fourth column of the database with the heading "STATE".

Furthermore, in this example, only the most recent period of activity of each of the terminals T1, T2, and T3 is stored in the database 4. This period of activity is identified herein for each terminal in the third column of the database 4 (headed "LAST SIP MESS"), firstly by the type of SIP message Msg sent or received by the terminal during this period, and secondly by the time t the message was sent or received.

Thus, in this example:

the most recent period of activity of the terminal T1 is represented by sending or receiving a message M1 at an instant t=x1;

the most recent period of activity of the terminal T2 is represented by sending or receiving a message M2 at an instant t=x2; and the most recent period of activity of the terminal T3 is represented by sending or receiving a message M3 at an instant t=x3.

For exemplary purposes, it is assumed that M1 is an SIP INVITE message, while M2 and M3 are SIP OPTIONS messages, and that x2<x1<x3. In other words, the most recent period of activity of the period T1 is later than the most recent period of activity of the terminal T2 and earlier than the most recent period of activity of the terminal T3.

Advantageously, this database 4 is kept up to date by the SCC-AS server 3 so as to reflect as accurately as possible the most recent periods of activity of the terminals of the user U1. This updating is possible because the SCC-AS server 3 is the anchor point for all of the communications passing via the IMS core network, so it is informed in real time about the periods of activity of the terminals T1, T2, and T3.

In the presently described implementation, this updating of the database 4 is performed firstly by the SCC-AS server 3 detecting a change of state of a terminal (which change of state is conveyed by the S-CSCF server in known manner, such as, for example:

as a result of a new terminal linked to the identifier IdSIP1 being registered, with this being reflected in the database 4 by adding a period of activity associated with this new terminal (i.e. new entry), this period being identified by an SIP REGISTER message and by an instant t corresponding to the instant at which the terminal was registered; or as a result of one of the terminals T1, T2, and T3 unregistering, which is reflected in the database 4 by deletion of the corresponding entry or by causing the state in the "STATE" column to become UNREGISTERED.

The database 4 is also updated in this example on detecting a new period of activity associated with a terminal already included in the database. Since this new period of activity is more recent than the period previously stored in the database for the terminal, it replaces the previously stored period of activity. As a result, the database 4 advantageously reflects only the most recent periods of activity of the terminals.

In a variant, it is possible to envisage updating periodically, with detected periods of activity being stored, e.g. in a random access memory (RAM) of the application server.

Figure 2:
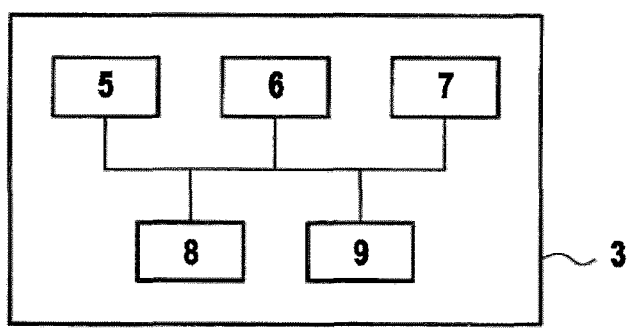
FIG. 2 is a diagrammatic representation of the hardware architecture of the FIG. 1 application server in a particular embodiment.

The SCC-AS server 3 in this example has the hardware architecture of a computer, as shown diagrammatically in FIG. 2. In particular, it comprises a processor 5, a RAM 6, a ROM 7, communication means 8 for communicating over the IMS core network (in particular incorporating means for performing the SIP protocol), together with consultation means 9 for consulting a database 4 in accordance with the invention.

The ROM 7 of the SCC-AS server 3 constitutes a storage medium in accordance with the invention that is readable by the processor 5 and that stores a computer program in accordance with the invention, including instructions for executing steps of a communication management method of the invention as described below with reference to FIG. 3.

FIG. 3 is a flow chart showing the main steps of a method of the invention in a particular implementation in which the method is performed by the SCC-AS server 3 in order to manage a communication placed by the terminal T of the user U2 and intended for the user U1. In this example, the communication is a telephone call.

Nevertheless, the invention is not limited to managing telephone calls; it also applies to other types of communication enabling multimedia data to be exchanged, both in the circuit-switched domain and in the packet-switched domain (e.g. SMS, multimedia messaging, etc.). Correspondingly, the invention is not limited to a communication placed by a terminal T, but also applies when the communication comes from some other piece of equipment, e.g. such as a server, etc.

In order to illustrate these steps, it is assumed that the terminals T1, T2, and T3 of the user U1 are registered with the core network IP-CN, and that the database 4 is up to date concerning the periods of activity of these terminals, and is identical to the example shown in FIG. 4.

In accordance with the invention, on receiving a communication (step E10) for the user U1 (i.e. a communication message for the user U1), the SCC-AS server 3 of the system 1 consults the database 4 using the identifier IdSIP1 allocated to the user U1 (step E20) in order to identify the most recently active terminal associated with the user U1 and registered with the core network IP-CN.

It should be observed that depending on the nature of the terminal T of the user U2 (i.e. whether or not it is suitable for communicating using the SIP protocol in this example), the communication message placed by the terminal T does not necessarily contain the identifier IdSIP1 of the user U1 on the core network IP-CN, but it may contain an identifier of the user U1 on the access network AN2, e.g. such as a telephone number. Nevertheless, while this communication message is transiting via the core network IP-CN, the CSCF control entities of the core network replace in conventional manner the identifier of U1 as contained in the message with the identifier IdSIP1 of the user U1 on the core network IP-CN, as stored in the HSS server.

Thus, on receiving the possibly modified communication message containing the identifier IdSP1 of the user U1, the SCC-AS server 3 interrogates the database 4 initially in order to determine whether there exists a terminal associated with the identifier IdSIP1 that is also registered with the core network (step E30).

If the database 4 indicates (E30, no) that there is no terminal associated with the identifier IdSIP1 and registered (and thus potentially active), a not available message is sent by the SCC AS server 3 to the terminal T (step E40) informing it that the communication has failed.

Otherwise (E30, yes), the database 4 is interrogated (step E50) to determine whether a plurality of terminals associated with the identifier IdSIP1 are registered simultaneously.

In the presently described example, the three terminals T1, T2, and T3 are currently registered with the core network (E50, yes).

In accordance with the invention, the SCC-AS server 3 selects the most recently active terminal from among these terminals for the purpose of routing the communication, i.e. it selects the terminal that is associated in the database 4 with the period of activity that is the most recent at the moment the database 4 is interrogated by the SCC-AS server 3 (or in a variant at the moment the SCC-AS server 3 receives or began processing the communication placed by the terminal T).

In the implementation described and shown in FIG. 3, it is also assumed that the SCC-AS server 3 selects from the terminals registered and listed in the database 4 a terminal that also satisfies a predetermined criterion relating to the nature of the activity of the terminal during its most recent period of activity.

Adding this constraint seeks to enable the SCC-AS server 3 to select a terminal corresponding to a message of the same kind as the communication placed by the terminal T of the user U2.

In this example, the communication being set up is a telephone call such that the SCC-AS server 3 is configured to select the most recently active terminal listed in the database 4 that sent or received an SIP message associated with setting up a call during its most recent period of activity (step E60).

To do this, in step E60, the SCC-AS server 3 uses the database 4 to analyze the type of message that was exchanged during its most recent period of activity by each of the terminals T1, T2, and T3 as stored in the database 4 and the instant at which the message was exchanged.

In the example shown in FIG. 4, only the message M1 is a message associated with setting up a call (M1 is an SIP INVITE message). The SCC-AS server 3 thus selects the terminal T1 in order to route the communication placed by the user U2.

In contrast, if a plurality of terminals are associated with respective call setup messages, then the SCC-AS server 3 selects the terminal corresponding to the most recent period of activity involving setting up a call.

Furthermore, if only one terminal is registered in the database 4 (E50, no), the communication is routed to that terminal, which terminal corresponds to the terminal having the most recent period of activity (step E70).

In another implementation of the invention, the SCC-AS server 3 takes into consideration as a criteria relating to the nature of the activity of the terminal, the sending or receiving during said activity of a message relating to setting up a telephone call, and does so independently of the nature of the communication that has been placed by the terminal T of the user U2, and that the application server is seeking to route.

In another implementation of the invention, the SCC-AS server 3 does not take into consideration any other criterion for selecting the terminal to which to route the communication. In this implementation, and with reference to the example shown in FIG. 4, it selects the terminal T3 for routing the communication.

The communication is then routed to the selected terminal, i.e. in the example of FIG. 4 to the terminal T1, in conventional manner (step E80).

It should be observed that in the presently described implementation, the database associates each terminal with the most recent period of activity of that terminal on the IMS core network, and the SCC-AS server 3 selects the terminal to which the communication is to be routed by analyzing the data available in the table identifying that period of activity (specifically the instant t and the message type Msg). In a variant, the database 4 could be maintained by the SCC-AS server 3 so as to reflect only the most recent period of activity of the most recently active terminal, such that the selection step consists in extracting from the database 4 the only terminal that is listed in the database.

The invention claimed is:

1. A management method for managing communications to a user having an identifier allocated thereto on a voice over IP core network, said method being performed by an application server of the voice over IP core network through which said communications transit, said method comprising:

maintaining a database associating a plurality of terminals registered on the voice over IP core network and linked to a same identifier of a user with at least one period of activity of a terminal of said plurality of terminals on the voice over IP core network, wherein the at least one period of activity is a protocol activity involving the sending or receiving of at least one message by the terminal over the voice over IP core network and is identified in the database by a time at which the terminal sent or received the at least one message, and wherein each period of activity is identified in the database by an instant at which the respective terminal sent or received at least one message over the voice over IP core network and by the type of said at least one message;

on receiving a communication, consulting the database to select one of the plurality of terminals linked to the same identifier of the user, said consulting comprising analyzing the instant corresponding to the most recent period of activity of each of the plurality of terminals and analyzing the type of the at least one message that was sent or received during said most recent period of activity to determine the terminal with the most recent period of activity, wherein the terminal that is selected is the terminal that is associated in the database with the most recent period of activity during which a message of the same type as said communication was sent or received, the most recent period of activity being the latest period of activity according to the database; and routing said communication to the selected terminal through the voice over IP core network.

2. A management method according to claim 1, wherein said database is updated by the application server, periodically or on the application server detecting a period of activity of a terminal linked to the identifier of the user on the voice over IP core network.

3. A management method according to claim 1, wherein during the selection process, the terminal linked to the identifier of the user and associated with the most recent period of activity is selected while also verifying a predetermined criterion relating to the nature of the activity of the terminal in that period.

4. A management method according to claim 3, wherein, during the selection process, the terminal linked to the identifier of the user that is s elected is the terminal associated with the most recent period of activity associated with setting up a communication with another terminal.

5. A management method according to claim 3, wherein the predetermined criterion relates to the nature of a message sent or received by the terminal during that period.

6. A management method according to claim 1, further including a process of routing the communication to the selected terminal.

7. A management method according to claim 1, wherein the voice over IP core network is an IMS core network and the application server is an SCC-AS server as defined by the 3GPP standard.

8. A computer comprising a non-transitory computer-readable medium having stored thereon a program including instructions for executing a management method for managing communications to a user having an identifier allocated thereto on a voice over IP core network, when said program is executed by said computer, wherein said method is performed by an application server of the voice over IP core network through which said communications transit and wherein said method comprises:

maintaining a database associating a plurality of terminals registered on the voice over IP core network and linked to a same identifier of a user with at least one period of activity of a terminal of said plurality of terminals on the voice over IP core network, wherein the at least one period of activity is a protocol activity involving the sending or receiving of at least one message by the terminal over the voice over IP core network and is identified in the database by a time at which the terminal sent or received the at least one message, and wherein each period of activity is identified in the database by an instant at which the respective terminal sent or received at least one message over the voice over IP core network and by the type of said at least one message;

on receiving a communication, consulting the database to select one of the plurality of terminals linked to the same identifier of the user, said consulting comprising analyzing the instant corresponding to the most recent period of activity of each of the plurality of terminals and analyzing the type of the at least one message that was sent or received during said most recent period of activity to determine the terminal with the most recent period of activity, wherein the terminal that is selected is the terminal that is associated in the database with the most recent period of activity during which a message of the same type as said communication was sent or received, the most recent period of activity being the latest period of activity according to the database; and routing said communication to the selected terminal through the voice over IP core network.

9. A non-transitory computer readable storage medium having a computer program stored thereon including instructions for executing a management method for managing communications to a user having an identifier allocated thereto on a voice over IP core network, wherein said method is performed by an application server of the voice over IP core network through which said communications transit and wherein said method comprises:

maintaining a database associating a plurality of terminals registered on the voice over IP core network and linked to a same identifier of a user with at least one period of activity of a terminal of said plurality of terminals on the voice over IP core network, wherein the at least one period of activity is a protocol activity involving the sending or receiving of at least one message by the terminal over the voice over IP core network and is identified in the database by a time at which the terminal sent or received the at least one message;

wherein each period of activity is identified in the database by an instant at which the respective terminal sent or received at least one message over the voice over IP core network and by the type of said at least one message;

on receiving a communication, consulting the database to select one of the plurality of terminals linked to the same identifier of the user, said consulting comprising analyzing the instant corresponding to the most recent period of activity of each of the plurality of terminals and analyzing the type of the at least one message that was sent or received during said most recent period of activity to determine the terminal with the most recent period of activity, wherein the terminal that is selected is the terminal that is associated in the database with the most recent period of activity during which a message of the same type as said communication was sent or received, the most recent period of activity being the latest period of activity according to the database; and routing said communication to the selected terminal through the voice over IP core network.

10. An application server of a voice over IP core network, suitable for managing communications transiting therethrough, the communications intended for a user having an identifier allocated thereto on the voice over IP core network, said server including a processor and a memory, said server configured to:

maintain a database associating a plurality of terminals registered on the voice over IP core network and linked to a same identifier of a user with at least one period of activity of a terminal of said plurality of terminals on the voice over IP core network, wherein the at least one period of activity is a protocol activity involving the sending or receiving of at least one message by the terminal over the voice over IP core network and is identified in the database by a time at which the terminal sent or received the at least one message, and wherein each period of activity is identified in the database by an instant at which the respective terminal sent or received at least one message over the voice over IP core network and by the type of said at least one message;

be activated on receiving a communication to consult the database in order to select a terminal linked to the identifier of the user, said consulting comprising analyzing the instant corresponding to the most recent period of activity of each of the plurality of terminals and analyzing the type of the at least one message that was sent or received during said most recent period of activity to determine the terminal with the most recent period of activity, wherein the terminal that is selected is the terminal that is associated in the database with the most recent period of activity during which a message of the same type as said communication was sent or received, the most recent period of activity being the latest period of activity according to the database; and route said communication to the selected terminal through the voice over IP core network.

11. A voice over IP core network system comprising:
the application server of claim 10; and
the database maintained by said application server and used to select terminals to which to route communications transiting via the application server and intended for users identified on the voice over IP core network.

12. A system according to claim 11, wherein the voice over IP core network is an IMS core network and the application server is an SCC-AS server as defined by the 3GPP standard.

* * * * *